No. 673,353. Patented Apr. 30, 1901.
E. B. ALLEN.
POWER TRANSMITTER.
(Application filed July 24, 1900.)
(No Model.)
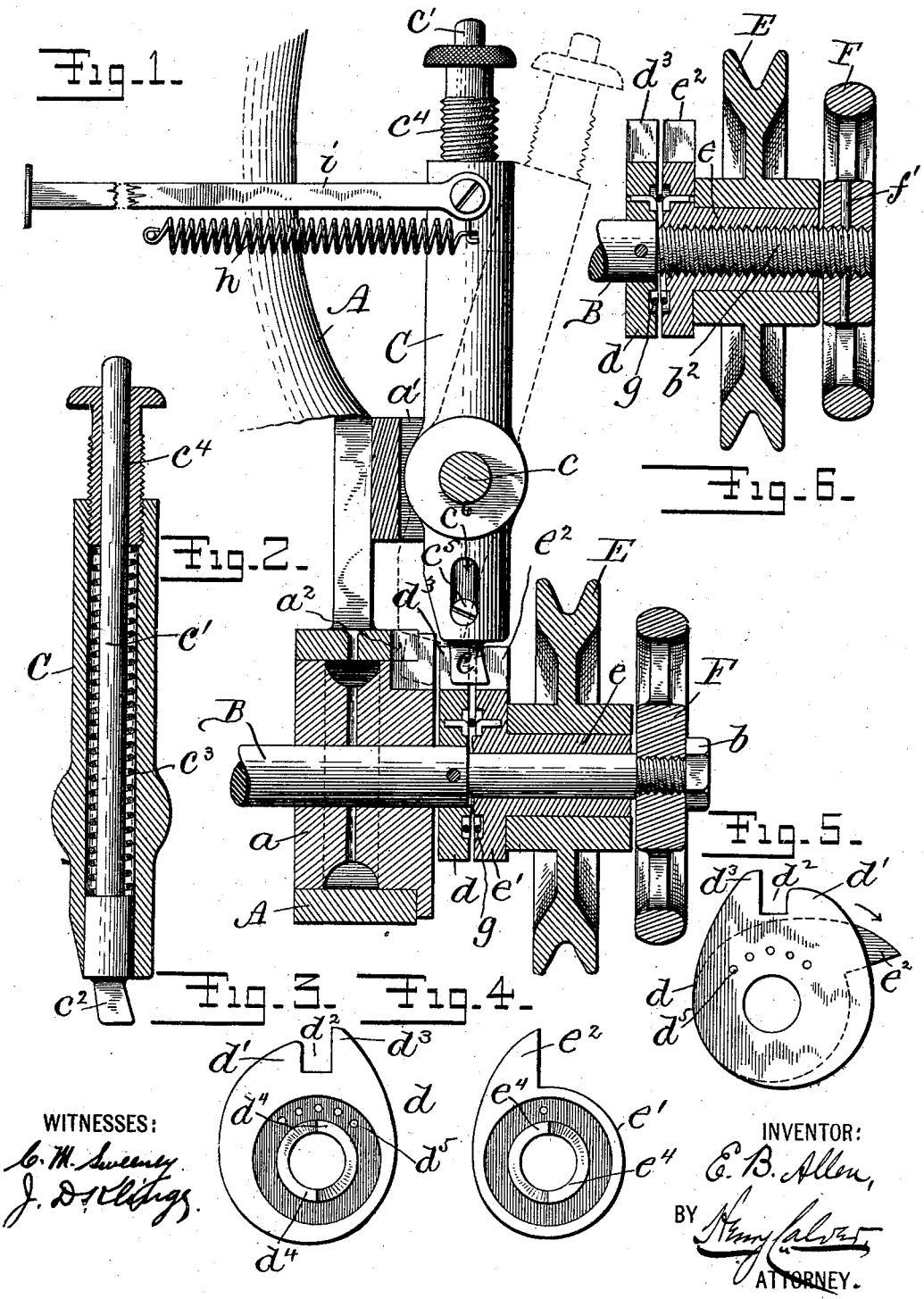

UNITED STATES PATENT OFFICE.

EDWARD B. ALLEN, OF ELIZABETH, NEW JERSEY, ASSIGNOR TO THE SINGER MANUFACTURING COMPANY, OF NEW JERSEY.

POWER-TRANSMITTER.

SPECIFICATION forming part of Letters Patent No. 673,353, dated April 30, 1901.

Application filed July 24, 1900. Serial No. 24,680. (No model.)

*To all whom it may concern:*

Be it known that I, EDWARD B. ALLEN, a citizen of the United States, residing at Elizabeth, in the county of Union and State of New Jersey, have invented certain new and useful Improvements in Power-Transmitters, of which the following is a specification, reference being had therein to the accompanying drawings.

This invention relates to that class of power transmitters or start and stop motion devices by which a loose driving-pulley may be operatively connected with a driving-shaft by a suitable clutch device or may be disconnected from said shaft when desired; and the object of the invention is to provide a power-transmitting or start and stop motion device of the class referred to in which the driving-pulley will have a strong clutch connection with the driving-shaft when the latter is to be rotated by said pulley and in which the clutch connection may be broken and the rotation of the driving-shaft quickly arrested without any sudden jar or shock.

In the accompanying drawings, Figure 1 is a sectional elevation of a start and stop motion or power-transmitting device embodying the invention. Fig. 2 is a vertical section of the start and stop motion or clutch-controlling lever. Fig. 3 is a detail face view of the stopping-disk attached to the driving-shaft. Fig. 4 is a detail face view of the clutch-disk loose on the driving-shaft. Fig. 5 is a detail view to show the relative positions of the two disks when the driving-pulley is clutched to the driving-shaft. Fig. 6 is a sectional view illustrating a slightly-modified form of the clutching device.

Referring to the drawings, A denotes a portion of the frame of a machine to which the power-transmitting device is to be applied, and B denotes the driving-shaft of said machine, said driving-shaft, as herein shown, having its bearing in the bushing $a$, fixed in the frame A.

C is the start and stop motion or clutch-controlling lever, pivoted at $c$ to a suitable bracket $a'$ with which the frame A is provided. Pinned to the shaft B is a stopping-disk $d$, provided with a cam portion $d'$, a notch $d^2$, and a peripheral stop projection $d^3$. Loosely mounted on a reduced portion of the shaft B is a sleeve $e$, provided with a flange or disk portion $e'$, having a tappet $e^2$. The shaft B is provided at its end with a suitable stop or abutment, herein shown as a hand-wheel F, which, as represented in Fig. 1, is screwed against a shoulder formed on the shaft B and rigidly held in place by a set-nut $b$, while in the construction shown in Fig. 6 said hand-wheel is fixed to the threaded portion $b^2$ of the shaft B by a transverse pin $f'$. Loosely mounted on the sleeve $e$ is a driving-pulley E, the hub of which is inclosed between the flange or disk portion $e'$ of the sleeve $e$ on one side and the stop or abutment afforded by the hub of the hand-wheel F on the other side, so that when the disk $e'$ is moved toward said hand-wheel the hub of the said driving-pulley will be clamped between the said disk $e'$ and the hub of said pulley.

In the construction shown in Figs. 1, 3, and 4 the stopping-disk $d$, fixed to the shaft B, is provided adjacent to said shaft with face-cam projections $d^4$, and the disk $e'$ is provided with similar face-cams $e^4$, adjacent to and facing the cams $d^4$ of the disk $d$. Both of said disks are recessed on their adjacent faces for the reception of a torsional spring $g$, one end of which is connected to the disk $d$ and the other end of which is connected to the disk $e'$, so as to have a tendency to turn said disk $e'$ and the sleeve $e$ in the direction denoted by the arrow in Fig. 5. This turning movement of the sleeve $e$ and its flange $e'$ by the said spring, when not resisted, causes the face-cams $d^4$ and $e^4$ to ride up on each other, and thus the disk $e'$ will be forced away from the disk $d$ and toward the hand-wheel F, so as to clamp the hub of the driving-pulley E between the said disk $e'$ and the hub of the said hand-wheel, thereby causing the said driving-pulley to be locked or clutched to the driving-shaft to rotate said shaft.

The start and stop motion or clutch-controlling lever C is formed hollow, and mounted therein is a sliding rod or plunger $c'$, provided at its lower end with a stopping-finger $c^2$, said sliding rod or plunger being pressed downward by a coil-spring $c^3$, held between a shoulder on the lower part of said plunger and a regulating-screw $c^4$, tapped in the upper portion of said lever, and by which screw the stress of said spring may be regulated or adjusted. The sliding rod or plunger $c'$ is prevented from turning by a screw $c^5$, attached to said sliding rod or plunger and received in a slot $c^6$ in the lever C, and which slot admits of a vertical or longitudinal movement of said sliding rod or plunger.

The start and stop motion or clutch-controlling lever C is brought to or retained in the position shown in full lines in Fig. 1 (and in which position the driving-pulley is unclutched from the driving-shaft) by a coil-spring $h$, connected with said lever and with the frame A, and said lever is moved to the position shown in dotted lines in Fig. 1 to allow the torsional spring $g$ to effect the clutching connection of the driving-pulley with the driving-shaft by means of a push-bar $i$, attached to said lever, and which may be operated either manually or automatically to effect the clutching operation and set the driving-shaft in motion.

In the slightly-modified form of the invention shown in Fig. 6 the face-cams $d^4$ and $e^4$ are omitted, and the shaft B is provided with a threaded portion $b^2$, and the sleeve $e$ is similarly threaded, so that a turning movement of the said sleeve by the torsional spring $g$ will cause an endwise movement of the said sleeve and its flange or disk $e'$ similar to that produced by the cams $d^4$ and $e^4$ to clamp the hub of the driving-pulley E between said disk $e'$ and the hub of the hand-wheel F.

In the use of the invention the clutch connection of the driving-pulley E with the shaft B is effected by moving the clutch-controlling lever to the position denoted by dotted lines in Fig. 1 and in which position the finger $c^2$ at the lower end of the sliding rod or plunger $c'$ is swung away from the tappet $e^2$ on the disk $e'$ and out of the notch $d^2$ of the disk $d$ into a recess $a^2$, formed for its reception in the frame A or the bushing $a'$. As soon as the finger $c^2$ is disengaged from the tappet $e^2$ the torsional spring $g$ acts to turn the sleeve $e$ and its flange or disk $e'$ in the direction denoted by the arrow in Fig. 5, and thus cause the hub of the driving-pulley to be clamped between said flange or disk $e'$ and the hub of the driven pulley, while the removal of the finger $c^2$ from the notch of the disk $d$ leaves the said disk and the shaft B, to which it is attached, free to rotate. When the machine is to be stopped, the bar $i$ is released, and the spring $h$ instantly causes the clutch-controlling lever C to assume the position shown in full lines in Fig. 1. When the smaller portion of the disk $d$ comes opposite the said finger and as the said disk continues to rotate, the said finger rides up the cam portion $d'$ of the said disk until the notch $d^2$ thereof comes into register with the said finger or projection, when the latter instantly snaps into said notch by the action of the coil-spring $c^3$, acting on the sliding rod or plunger $c'$, by which the said finger $c^2$ is carried. As the said finger $c^2$ rides up the cam $d'$ its pressure thereon, owing to the stress of the spring $c^3$, causes the said finger to act as a brake to retard the motion of the driving-shaft, and the pressure of the spring $c^3$ may be so regulated by the screw $c^4$ that by the time the notch $d^2$ comes opposite the said finger $c^2$ the rotation of the shaft and the disk $d$, attached thereto, will be nearly arrested, so that when the stop projection $d^3$ on the said disk comes in contact with said finger there will be little or no shock at said contact, as the pressure of said spring on the plunger $c'$ may be so regulated, according to the speed at which the shaft may ordinarily be running, as merely to allow the said finger $c^2$ to ride up the said cam portion $b'$ and bring the notch $d^2$ into register with the said finger before the machine stops, the brake action of the finger $c^2$ resulting from the pressure of the spring $c^3$ being sufficient, with a proper adjustment of the screw $c^4$, to just about stop the rotation of the driving-shaft as the notch $d^2$ comes into register with stopping-finger $c^2$. When the clutch-lever is moved to the position shown in full lines in Fig. 1, the finger $c^2$ comes into the path of movement of the tappet $e^2$ on the disk or flange $e'$, so that when said tappet strikes said finger the said disk or flange and the sleeve $e$ will be turned backward in the direction opposite that denoted by the arrow in Fig. 5 to unclutch or release the driving-wheel, and as the contact of the said tappet with the said stopping-finger $c^2$ is cushioned by the torsional spring $g$ no sudden jar or shock will be produced by this unclutching operation.

A comparatively light torsional spring $g$ may be employed to effect the clutching operation, owing to the fact that the driving-pulley E will be rotated in the direction denoted by the arrow in Fig. 5 or in the direction in which the clutch flange or disk and its sleeve are turned to effect the clutching operation, so that as soon as the initial clutching operation is effected the rotation of the driving-pulley will have a tendency to increase the clutching action, and thereby cause the said driving-pulley to be securely gripped by the clutching parts, and thus be strongly connected with the driving-shaft. The stress of the torsional spring $g$ may be regulated or varied by inserting one end thereof in any one of the holes $d^5$ in the fixed disk $d$.

Having thus described my invention, I claim and desire to secure by Letters Patent—

1. In a clutch power-transmitting device, the combination with a driving-shaft, of a fixed abutment on said shaft, a disk or abutment loose on said shaft but adapted to rotate therewith, a loose driving-pulley the hub of which is mounted between said fixed abutment and said loose disk or abutment so as to be clamped between said abutments and through the said fixed abutment to be connected with said shaft when the latter is to be rotated, means for turning said loose disk or abutment and means for moving said loose disk or abutment endwise of said shaft, as it is turned, to clutch or unclutch said driving-pulley.

2. In a clutch power-transmitting device, the combination with a driving-shaft, of a fixed abutment on said shaft, a loose disk or abutment on said shaft, a loose driving-pulley mounted between said fixed abutment and said loose disk or abutment, means for turning said loose disk or abutment, means for moving said loose disk or abutment endwise of said shaft, as it is turned, to clutch or unclutch said driving-pulley, a clutch-controlling lever provided with a spring-pressed brake device, and a cam, fixed to said shaft, against which said brake device presses.

3. In a clutch power-transmitting device, the combination with a driving-shaft provided with a fixed stop or abutment, as hand-wheel F, and with a fixed disk having a cam portion and a notch, of a disk loosely mounted on said shaft and having a tappet, a torsional spring connecting said disks, a driving-pulley loose relative to said shaft and the hub of which is inclosed between said loose disk and said fixed stop or abutment, means for effecting a movement, endwise of said shaft, of said loose disk when the latter is turned by the said torsional spring, and a clutch-controlling lever provided with a spring-pressed plunger having a finger to engage said tappet and to ride up the cam portion of said fixed disk and enter the notch with which the latter is provided.

4. In a clutch power-transmitting device, the combination with a driving-shaft provided with a fixed stop or abutment, as hand-wheel F, and with a fixed disk having a cam portion and a notch, of a disk loosely mounted on said shaft and having a tappet and a sleeve, a torsional spring connecting said disks, a driving-pulley loosely mounted on said sleeve and the hub of which is inclosed between said loose disk and said fixed stop or abutment, means for effecting a movement, endwise of said shaft, of said loose disk when the latter is turned by the said torsional spring, and a clutch-controlling lever provided with a spring-pressed plunger having a finger to engage said tappet and to ride up the cam portion of said fixed disk and enter the notch with which the latter is provided.

5. In a clutch power-transmitting device, the combination with a driving-shaft provided with a fixed stop or abutment, as hand-wheel F, and with a fixed disk having a cam portion and a notch, of a disk loosely mounted on said shaft and having a tappet and a sleeve, a torsional spring connecting said disks, a driving-pulley loosely mounted on said sleeve between said loose disk and said fixed stop or abutment, means for effecting movement, endwise of said shaft, of said loose disk when the latter is turned by said torsional spring, a clutch-controlling lever provided with a spring-pressed plunger having a finger to engage said tappet and to ride up the cam portion of said fixed disk and enter the notch with which the latter is provided, and means for varying the pressure of said finger against the cam portion of said fixed disk.

6. In a clutch power-transmitting device, the combination with a driving-shaft provided with a fixed stop or abutment, as hand-wheel F, and with a fixed disk having a cam portion and a notch, of a disk loosely mounted on said shaft and having a tappet and a sleeve, a torsional spring connecting said disks, a driving-pulley loosely mounted on said sleeve between said loose disk and said fixed stop or abutment, contiguous face-cams on said disks for effecting a movement, endwise of said shaft, of said loose disk when the latter is turned by said torsional spring, a clutch-controlling lever provided with a spring-pressed plunger having a finger to engage said tappet and to ride up the cam portion of said fixed disk and enter the notch with which the latter is provided, and means for varying the pressure of said finger against the cam portion of said fixed disk.

In testimony whereof I affix my signature in the presence of two witnesses.

EDWARD B. ALLEN.

Witnesses:
HENRY CALVER,
HENRY J. MILLER.